J. COPELAND.
CULTIVATOR.

No. 51,428.

Patented Dec. 12, 1865.

UNITED STATES PATENT OFFICE.

JOHN COPELAND, OF QUASQUETON, IOWA.

IMPROVEMENT IN CULTIVATORS.

Specification forming part of Letters Patent No. 51,428, dated December 12, 1865.

*To all whom it may concern:*

Be it known that I, JOHN COPELAND, of Quasqueton, in the county of Buchanan and State of Iowa, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
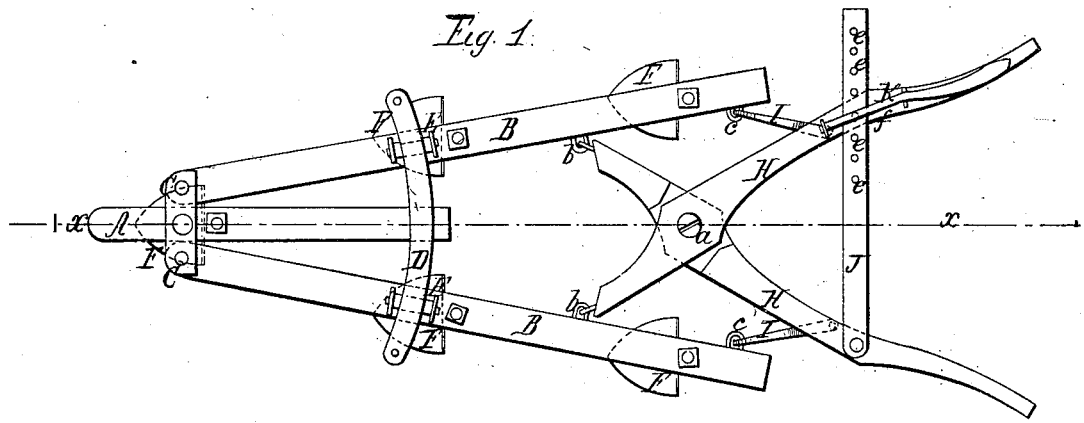
Figure 2:
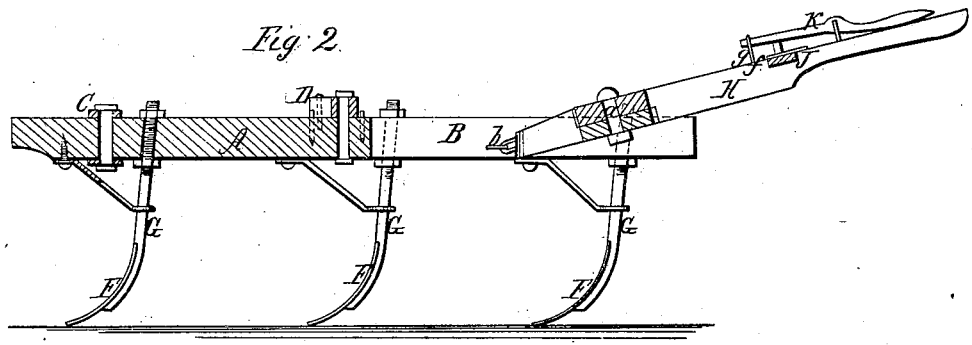

Figure 1 is a plan or top view of my invention; Fig. 2, a side sectional view of the same, taken in the line $x\ x$, Fig. 1.

Similar letters of reference indicate corresponding parts.

This invention relates to a new and improved cultivator of that class which is capable of being expanded or contracted in order to conform to the width of the spaces between the rows of plants under cultivation.

The invention consists in a novel application of levers to the plow-beams, whereby the latter may be operated, expanded, and contracted with greater facility than hitherto and while the device or implement is at work, so that it will be under the complete control of the operator.

A represents the draft-pole, and B B the two plow-beams, of the cultivator. The front ends of the plow-beams are connected, by joints or hinges C C, to the draft-pole, one at each side, and to the upper surface of the rear part of the draft-pole there is attached a curved or segment bar, D, which rests or bears upon friction-rollers E E, fitted in the plow-beams. These rollers admit of the plow-beams expanding and contracting without causing much friction.

F represents the plows, which may be of the usual shovel form, and are attached to standards G, secured to the beams in any proper manner.

H H represent two levers, which cross each other and are connected by a fulcrum-pin, $a$, as shown clearly in Fig. 1. The front ends of the levers H are connected, by eyebolts and staples $b$, to the inner sides of the plow-beams B B, and said levers are supported in an inclined position by rods I I, which are connected to the rear ends of the beams by joints formed by having the ends of the rods bent in hook form and passing through staples $e$ in the beams, the opposite ends of said rods being attached to the levers by pivots.

By this arrangement it will be seen that the plow-beams may be expanded and contracted by the driver operating the levers H H, which also serve as handles for the implement. A good leverage power is obtained, which renders the adjustment of the plow-beams very easy, admitting of their being readily expanded and contracted while the implement is being drawn along in the prosecution of its work to compensate for the variation in the width of the spaces between the rows of plants.

The plow-beams may be held at any desired point within the scope of their adjustment by means of a fastening composed of a bar, J, attached to one of the levers H, said bar being perforated with holes $e$ and passing through a guide, $f$, attached to the other lever H, the latter lever having a short lever, K, attached to it provided with a pin, $g$, which may be made to pass through any of the holes $e$ into the lever H, to which it is attached. This lever K may be readily operated by the hand so as to secure the levers H H or prevent them from casually moving, and also to admit of their being left free to move and be operated to adjust or expand and contract the plow-beams.

Having thus described my invention, I claim as new and desire to secure by Letters Patent—

1. The two crossed levers H H, connected by a pin, $a$, and applied to the plow-beams B B, to operate in the manner substantially as and for the purpose herein set forth.

2. The combination of the levers H H, perforated bar J, lever K, and pin $g$, arranged to operate in the manner and for the purpose specified.

JOHN COPELAND.

Witnesses:
 ELIAS POLEN,
 J. PERKINS.